(12) United States Patent
Stavely

(10) Patent No.: US 7,978,245 B2
(45) Date of Patent: Jul. 12, 2011

(54) METHOD AND APPARATUS FOR CONTROLLING COLOR BALANCE IN A DIGITAL IMAGING DEVICE

(75) Inventor: Donald J. Stavely, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1469 days.

(21) Appl. No.: 10/877,087

(22) Filed: Jun. 24, 2004

(65) Prior Publication Data
US 2005/0285971 A1  Dec. 29, 2005

(51) Int. Cl.
*H04N 5/335* (2011.01)
*H04N 5/14* (2006.01)
(52) U.S. Cl. .................. 348/320; 348/294
(58) Field of Classification Search ............. 348/231, 348/223.1, 273, 296–298, 303
See application file for complete search history.

(56) References Cited

U.S. PATENT DOCUMENTS

| | | | | |
|---|---|---|---|---|
| 4,471,228 A * | 9/1984 | Nishizawa et al. | ........... | 348/298 |
| 5,063,439 A * | 11/1991 | Tabei | ........... | 348/272 |
| 6,271,884 B1 * | 8/2001 | Chung et al. | ........... | 348/370 |
| 6,667,769 B2 * | 12/2003 | Harton et al. | ........... | 348/308 |
| 6,873,360 B1 * | 3/2005 | Kawashiri | ........... | 348/296 |
| 6,943,837 B1 * | 9/2005 | Booth, Jr. | ........... | 348/297 |
| 6,947,084 B2 * | 9/2005 | Kaifu et al. | ........... | 348/247 |
| 6,960,757 B2 * | 11/2005 | Merrill et al. | ........... | 250/226 |
| 7,129,983 B2 * | 10/2006 | Rantanen et al. | ........... | 348/371 |
| 2002/0067415 A1 * | 6/2002 | Denyer et al. | ........... | 348/294 |
| 2002/0113886 A1 * | 8/2002 | Hynecek | ........... | 348/302 |
| 2003/0184659 A1 * | 10/2003 | Skow | ........... | 348/223.1 |
| 2005/0190273 A1 * | 9/2005 | Toyama et al. | ........... | 348/231.5 |

* cited by examiner

*Primary Examiner* — Lin Ye
*Assistant Examiner* — Euel K Cowan

(57) ABSTRACT

A digital imaging device provides for different exposure times for each of a set of color components, the exposure time of each color component being inversely related to its strength relative to the other color components in a pre-exposure frame. By compensating for color imbalance in the scene during exposure, the digital imaging device improves the signal-to-noise ratio and, hence, the quality of the resulting digital image.

17 Claims, 7 Drawing Sheets

METHOD AND APPARATUS FOR CONTROLLING COLOR BALANCE IN A DIGITAL IMAGING DEVICE

FIELD OF THE INVENTION

The present invention relates generally to digital photography and more specifically to techniques for controlling color balance in digital images captured by a digital imaging device.

BACKGROUND OF THE INVENTION

Digital imaging devices such as digital cameras typically include an area-array imaging sensor such as a charge-coupled device (CCD) or CMOS sensor. Such a sensor has a color filter array that produces picture elements ("pixels") for each of a set of color components (typically red, green, and blue). The amount of signal in each color component depends on the color balance of the scene. Color balance is determined not only by the colors of objects in the scene but also by the color of the illuminant. For example, pictures taken in the shade on a sunny day have a strong blue cast due to the blue sky illuminating the scene. Pictures taken indoors under incandescent lighting have a reddish or yellowish cast.

Once a digital imaging device has captured a raw image, the raw data from the sensor must be processed to produce a finished image. One part of this process is a "color balance" step that removes most or all of the effect of the illuminant on the colors in the image. This process mimics the way the brain compensates for the illuminant the eye sees. That is, humans see white as white independent of the color of the illuminant. Likewise, a digital imaging device post-processes images to ensure that white is reproduced as white independent of the illuminant.

Unfortunately, strongly colored illuminants result in large imbalances in the three color components of the sensor. The exposure time is set based on the strongest color component to avoid saturating pixels of any color. The result is that the other two color components are much smaller than the dominant color component. The weaker colors can be amplified before, during, or after conversion from the analog to the digital domain. However, "gaining up" the weaker color components of the image amplifies the noise in those colors as well.

It is thus apparent that there is a need in the art for an improved method and apparatus for controlling color balance in a digital imaging device.

SUMMARY OF THE INVENTION

A method for controlling the color balance of a digital image captured by a digital imaging device is provided. An apparatus for carrying out the method is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

Color balance may be effectively controlled during the capture of a digital image by providing a different exposure time for each color component—shorter for the stronger colors and longer for the weaker colors. This technique directly compensates for scene color imbalance and color imbalance caused by the illuminant. The result is improved signal-to-noise ratio (SNR) and image quality. The independent exposure times may be calculated from a pre-exposure frame such as that normally used for autoexposure calculation. Instead of setting the exposure based only on the strongest color component, an exposure time for each color component may be computed. In one embodiment, the chosen exposure times may fully balance the color components, maximizing SNR and minimizing graininess in the image. In another embodiment, partial compensation may be deployed to reduce temporal color artifacts.

Figure 1A:
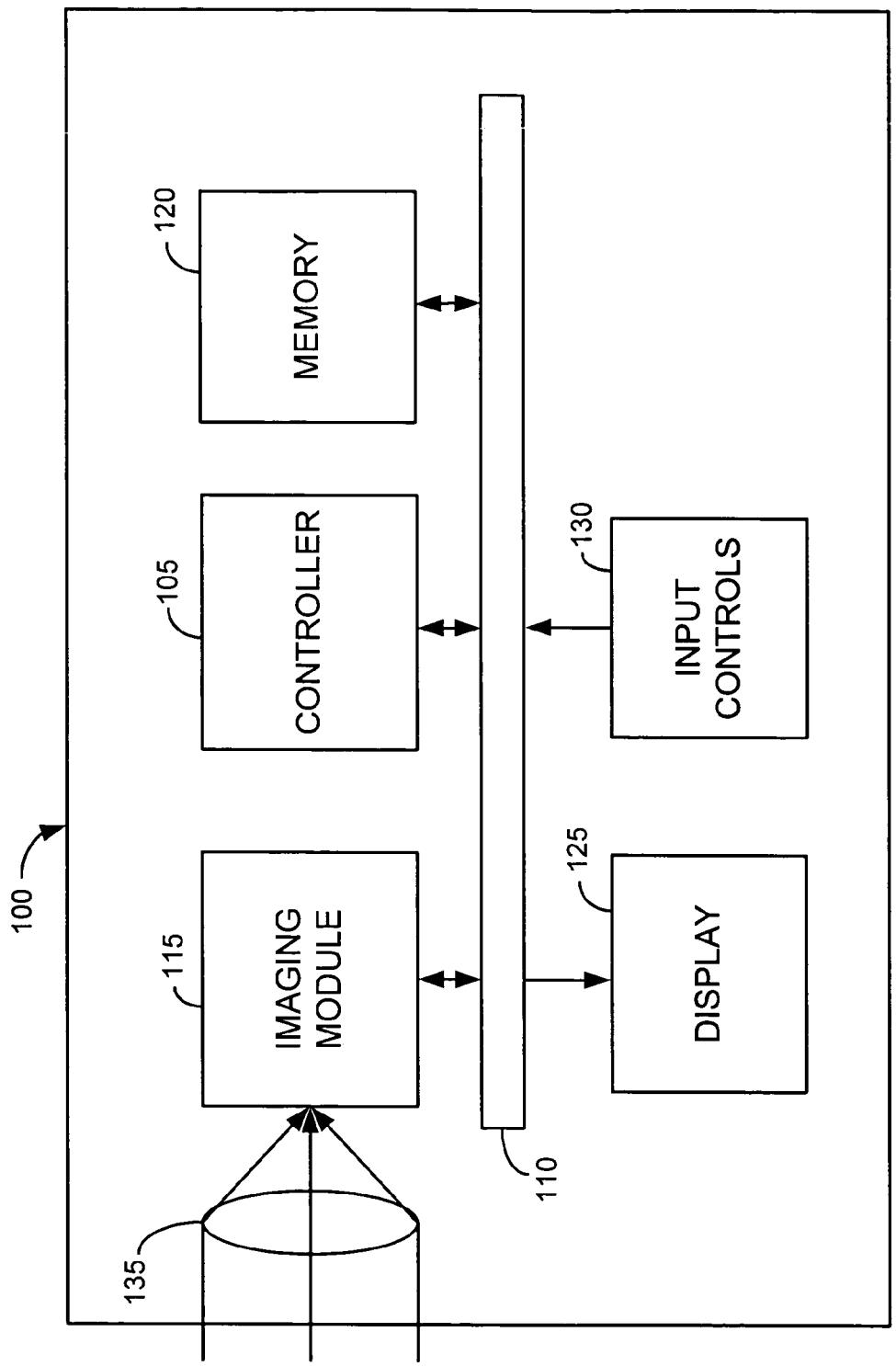
FIG. 1A is a block diagram of a digital imaging device in accordance with an illustrative embodiment of the invention.

FIG. 1A is a functional block diagram of a digital imaging device 100 in accordance with an illustrative embodiment of the invention. Digital imaging device 100 may be a digital camera, digital camcorder, or any other device capable of converting optical images to digital images. In FIG. 1A, controller 105 communicates over data bus 110 with imaging module 115, memory 120, display 125, and input controls 130. Optical system 135 produces optical images that are converted to digital images by imaging module 115. Input controls 130 may comprise a shutter button to initiate image capture and other input controls for controlling the operation of digital imaging device 100.

Figure 1B:
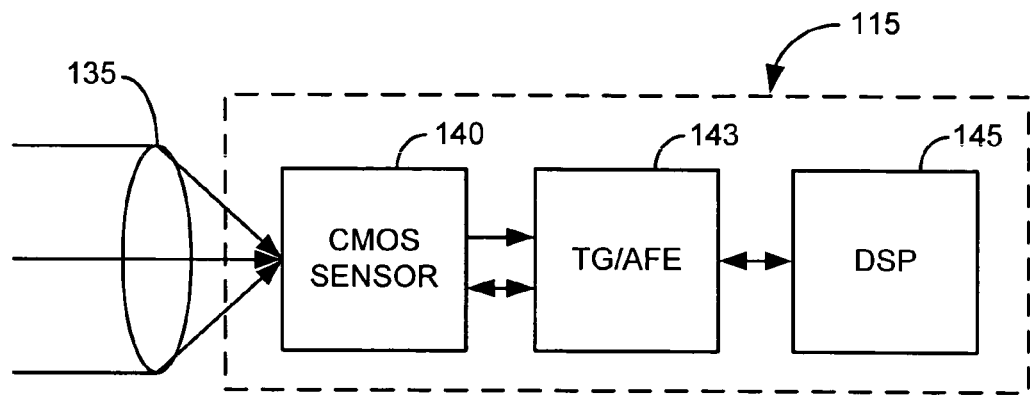
FIG. 1B is a functional block diagram of an imaging module of the digital imaging device shown in FIG. 1A in accordance with an illustrative embodiment of the invention.

FIG. 1B is a functional block diagram of imaging module 115 in accordance with an illustrative embodiment of the invention. Imaging module 115 may comprise a row-addressable area-array imaging sensor ("sensor") 140, a timing generator/analog front end (TG/AFE) 143, and a digital signal processor (DSP) 145. As indicated in FIG. 1B, both data and control signals may connect sensor 140 with TG/AFE 143. Sensor 140 may be any kind of area-array imaging sensor that supports random access (row and column access) of individual pixels 150. It is also advantageous, though not required in all embodiments, for sensor 140 to support non-destructive readout (i.e., the pixels 150 of sensor 140 are not discharged when read, allowing the same pixel 150 to be read multiple times). The relevance of non-destructive readout will become apparent later in this description. In the example of FIG. 1B, sensor 140 is a CMOS sensor. Such an imaging sensor typically has the characteristics just described (random access of pixels 150 and non-destructive readout).

Figure 1C:
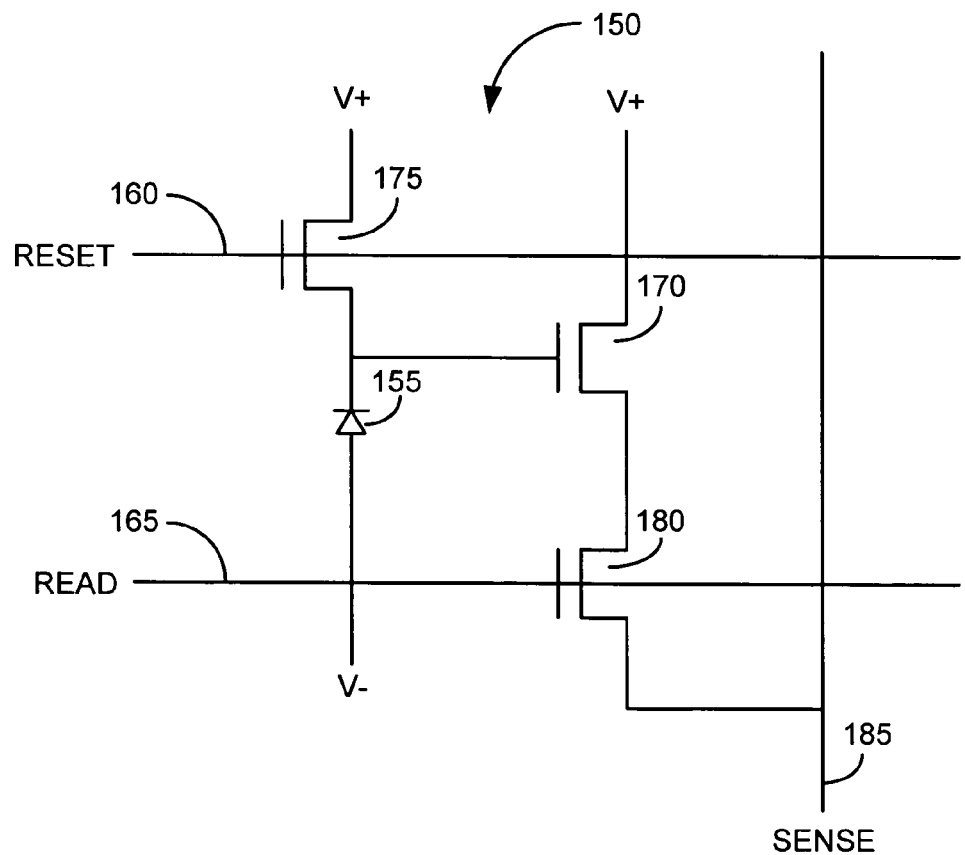
FIG. 1C is a schematic diagram of a three-transistor CMOS-sensor pixel in accordance with an illustrative embodiment of the invention.

FIG. 1C is a schematic diagram of a three-transistor pixel 150 of a CMOS sensor 140 in accordance with an illustrative embodiment of the invention. FIG. 1C is merely one example of a pixel schematic in the context of a CMOS sensor. As those skilled in the art will recognize, other pixel implementations are available and may be used in implementing the principles of the invention. In FIG. 1C, reverse-biased photo diode 155 creates a depletion region as pixel 150 is exposed to light. Reset line 160 and read line 165 delimit the beginning and end, respectively, of an exposure of pixel 150. Reset line 160 and read line 165 do so by controlling the state of FETs 170, 175, and 180. When read line 165 is asserted, a voltage may be read on sense line 185. Since sensor 140 is addressable by rows and columns, sensor 140 may be reset row by row and subsequently read out row by row.

Figure 1D:
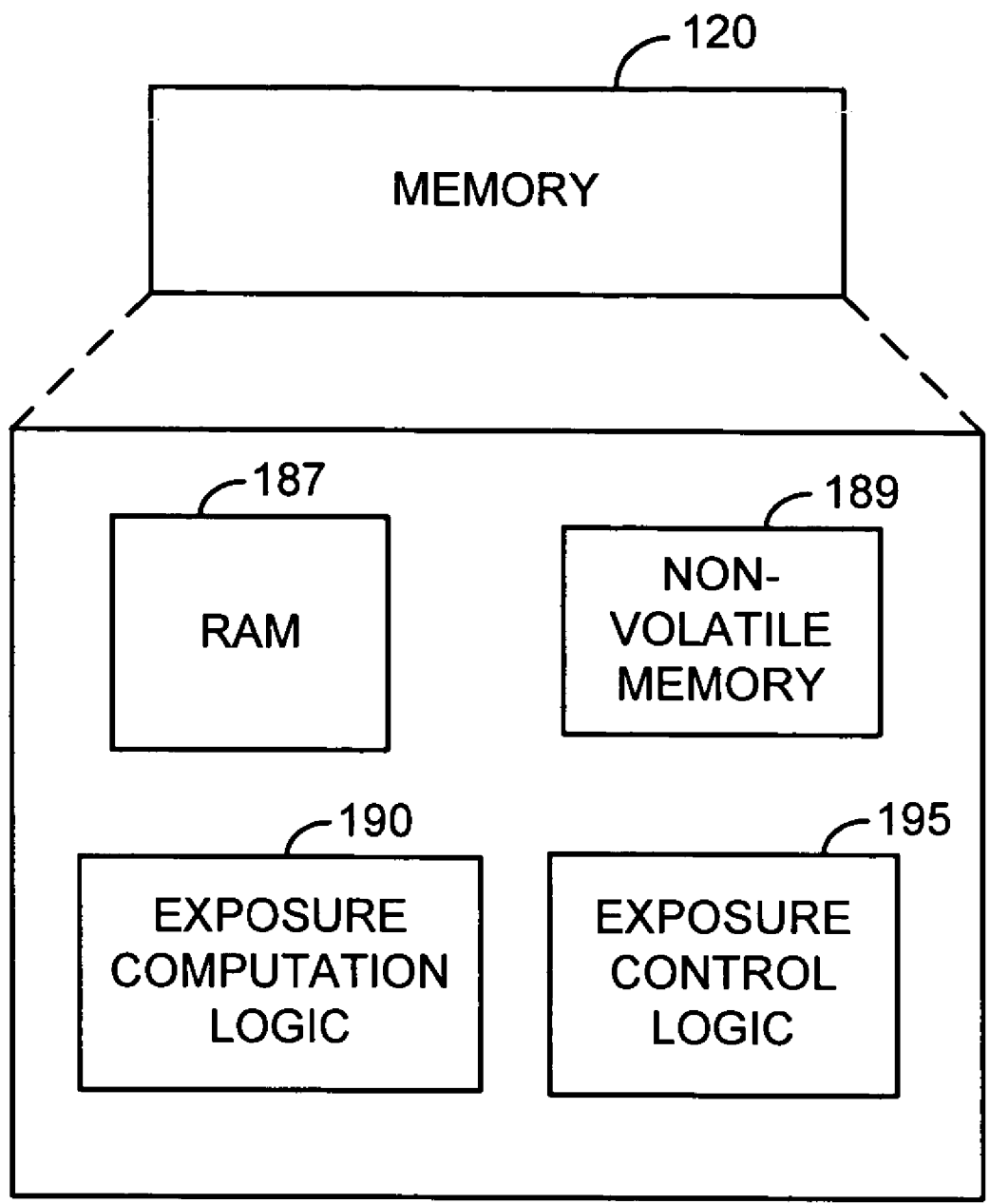
FIG. 1D is a functional diagram of a memory of the digital imaging device shown in FIG. 1A in accordance with an illustrative embodiment of the invention.

FIG. 1D is a functional diagram of memory 120 in digital imaging device 100 in accordance with an illustrative embodiment of the invention. Memory 120 may comprise both random-access memory (RAM) 187 and non-volatile memory 189, the latter of which may be of the removable variety. Memory 120 may also include exposure computation logic 190 and exposure control logic 195. Exposure computation logic 190 may analyze a pre-exposure frame to determine an exposure time for each of a set of color components measured by sensor 140. Exposure computation logic 190 may be configured to determine an exposure time for each color component that is inversely related to the strength, in the pre-exposure frame, of that color component relative to the other color components. For example, an indoor scene under an incandescent illuminant in which red is the dominant color component may be captured with a shortest exposure time for red, an intermediate exposure time for green, and a longest exposure time for blue. Likewise, an outdoor scene in the shade on a sunny day in which blue is the dominant color component may be captured with a shortest exposure time for blue, an intermediate exposure time for green, and a longest exposure time for red. Exposure control logic 195 may cooperate with TG/AFE 143 to expose the pixels 150 of each color component of sensor 140 for the exposure time determined by exposure computation logic 190. Thus, exposure control logic 195 may control the reading out of pixels 150 of each color component from sensor 140 after the appropriate exposure time determined by exposure computation logic 190 has elapsed. Those skilled in the art will recognize that exposure control logic 195 may be implemented as, for example, a counter-and-state-machine-based control circuit.

In one embodiment, exposure computation logic 190 and exposure control logic 195 are implemented as firmware stored-program instructions that are executed by controller 105. In general, the functionality of exposure computation logic 190 and exposure control logic 195 may be implemented in hardware, firmware, software, or any combination thereof. Further, exposure computation logic 190 and exposure control logic 195 may be implemented as part of a single functional unit. They are shown as separate functional units in FIG. 1D merely to facilitate clarity in this detailed description.

Figure 2:
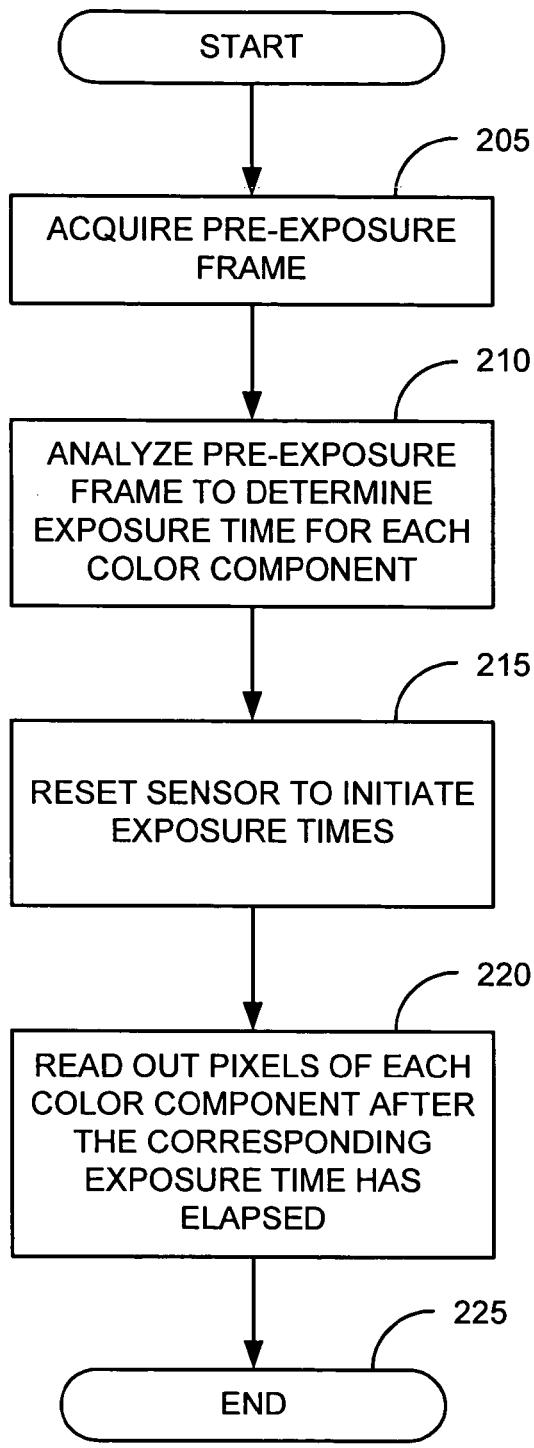
FIG. 2 is a flowchart of a method of operation of the digital imaging device shown in FIG. 1A in accordance with an illustrative embodiment of the invention.

FIG. 2 is a flowchart of the operation of digital imaging device 100 in accordance with an illustrative embodiment of the invention. At 205, digital imaging device may acquire a pre-exposure frame. At 210, exposure computation logic 190 may analyze a pre-exposure frame to determine the relative strengths in the scene of the color components. The color components may include, for example, red, green, and blue. Alternatively, a system employing cyan, magenta, and yellow may be used. Based on the measured relative strengths of the color components, exposure computation logic 190 may determine, for each color component, an exposure time that compensates for color imbalance in the scene. That is, exposure computation logic 190 may determine an exposure time for each color component that is inversely related to its strength relative to the other color components. In some embodiments, the exposure time determined for each color component may be inversely proportional to its strength relative to the other color components. For example, consider a situation in which the green color component is half as strong as red, and blue is one quarter as strong as red. Exposure computation logic 190 may compensate for this imbalance by exposing green twice as long as red and blue four times as long as red. At 215, exposure control logic 195 resets sensor 140 to initiate the exposure time of each color component. Finally, at 220, exposure control logic 195 reads out the pixels 150 of each color component after the corresponding exposure time has elapsed. The process then terminates at 225.

Though sensor 140 may be randomly accessed as explained above, it typically cannot be reset all at once or read out all at once. Consequently, reset and readout are performed row by row (e.g., a row at a time from top to the bottom). Once a row of sensor 140 has been read out, individual pixels 150 may be accessed by addressing the appropriate columns. For long exposures, sensor 140 may be completely reset from top to bottom, for example, and then completely read out from top to bottom. Thus, in such an exposure, the reset and readout operations may be performed sequentially. For short exposures, the read process may follow just behind the reset process. The time between each pixel's reset and its readout is fixed (the exposure time for that color component), but the exposure "rolls" down sensor 140. This arrangement may be termed a "rolling shutter." It mimics a focal-plane shutter in a single-lens-reflex (SLR) film camera. During such an exposure, reset and readout occur concurrently but with staggered starting times for the different color components. The implementation of a rolling shutter in the context of the invention will now be explored in more detail.

Figure 3A:
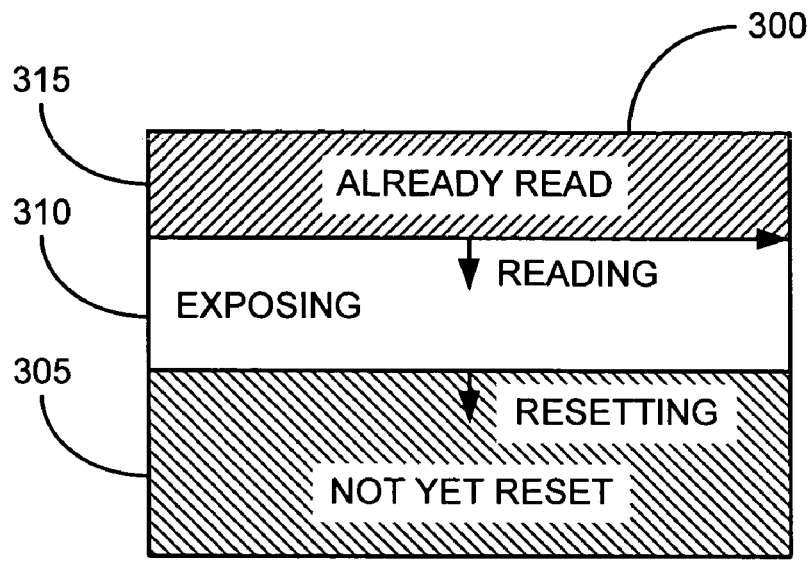
FIG. 3A is a diagram of a prior-art method for implementing a rolling shutter using a CMOS sensor.

Consider first a prior-art rolling shutter implementation in which all color components have the same exposure time. FIG. 3A shows a typical prior-art implementation of a such a rolling shutter using a CMOS sensor 300. First, the reset process is begun. The portion of sensor 140 not yet reset is indicated in FIG. 3A as region 305. The portion of sensor 140 labeled 310 represents pixels still being exposed to light. The read operation follows behind reset by an interval equal to the exposure time, which is the same for all pixels in this prior-art implementation. Pixels already read are indicated by region 315 in FIG. 3A.

Figure 3B:
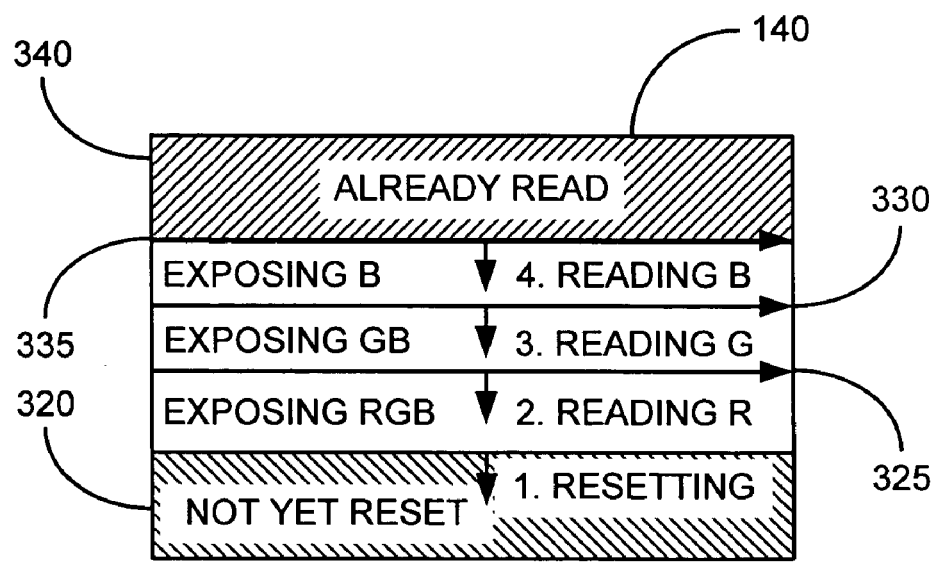
FIGS. 3B and 3C are diagrams showing how a rolling shutter may be implemented using independent exposure times for the various color components in accordance with an illustrative embodiment of the invention.

In the context of the invention, the rolling-shutter implementation shown in FIG. 3A may be modified as shown in FIG. 3B. In FIG. 3B, it is assumed that red is the dominant color component (e.g., an indoor scene under incandescent lighting). In FIG. 3B, the reset process is first begun in row-by-row fashion from the top of sensor 140 toward the bottom. Pixels 150 not yet reset are indicated as region 320. After an appropriate relatively short exposure time (first delay) determined by exposure computation logic 190, red pixels 150 are read out (325). After a longer second delay, green pixels 150 are read out (330). Finally, after a longest third delay, blue pixels 150 are read out (335). Pixels 150 already read are indicated as region 340 in FIG. 3B. In this manner, a rolling shutter with independent exposure times for the various color components may be used to control color balance in a short exposure.

Figure 3C:
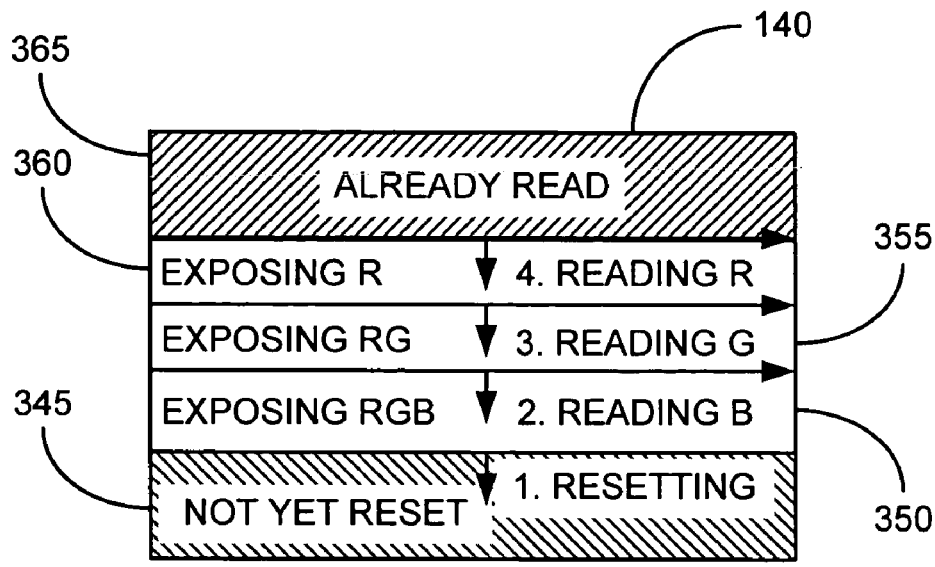

FIG. 3C shows an example of the rolling shutter described in connection with FIG. 3B for the case in which blue is the dominant color component. The same principles as those discussed in connection with FIG. 3B apply to FIG. 3C.

Figure 4A:
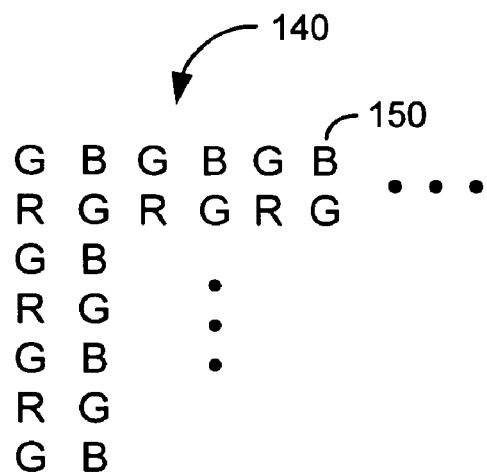
FIG. 4A is an illustration of a color filter array of an area-array imaging sensor in accordance with an illustrative embodiment of the invention.

Those skilled in the art will recognize that the implementation of the rolling shutter shown in FIGS. 3B and 3C may, depending on the design of sensor 140, require reading the same pixel 150 multiple times, which requires a non-destructive readout. This situation arises because sensor 140 may have a color filter array that is configured to produce a Bayer pattern such as that shown in FIG. 4A, in which green pixels 150 are interleaved among red and blue pixels 150 in the same row of sensor 140. Consider an example in which blue pixels 150 are read out before green pixels 150 (i.e., blue is the dominant color component and receives the shortest exposure time). Reading the blue pixels 150 in a given row unavoidably involves reading the green pixels 150 in that same row (in the analog domain at least), even though the green pixels 150 may be ignored at that stage. Those skilled in the art will recognize that the unwanted green pixels 150 in the row do not have to be converted to the digital domain from the analog domain at that point. When the time arrives to read the green pixels 150, the same row may be read out again, provided that sensor 140 supports non-destructive readout.

Figure 4B:
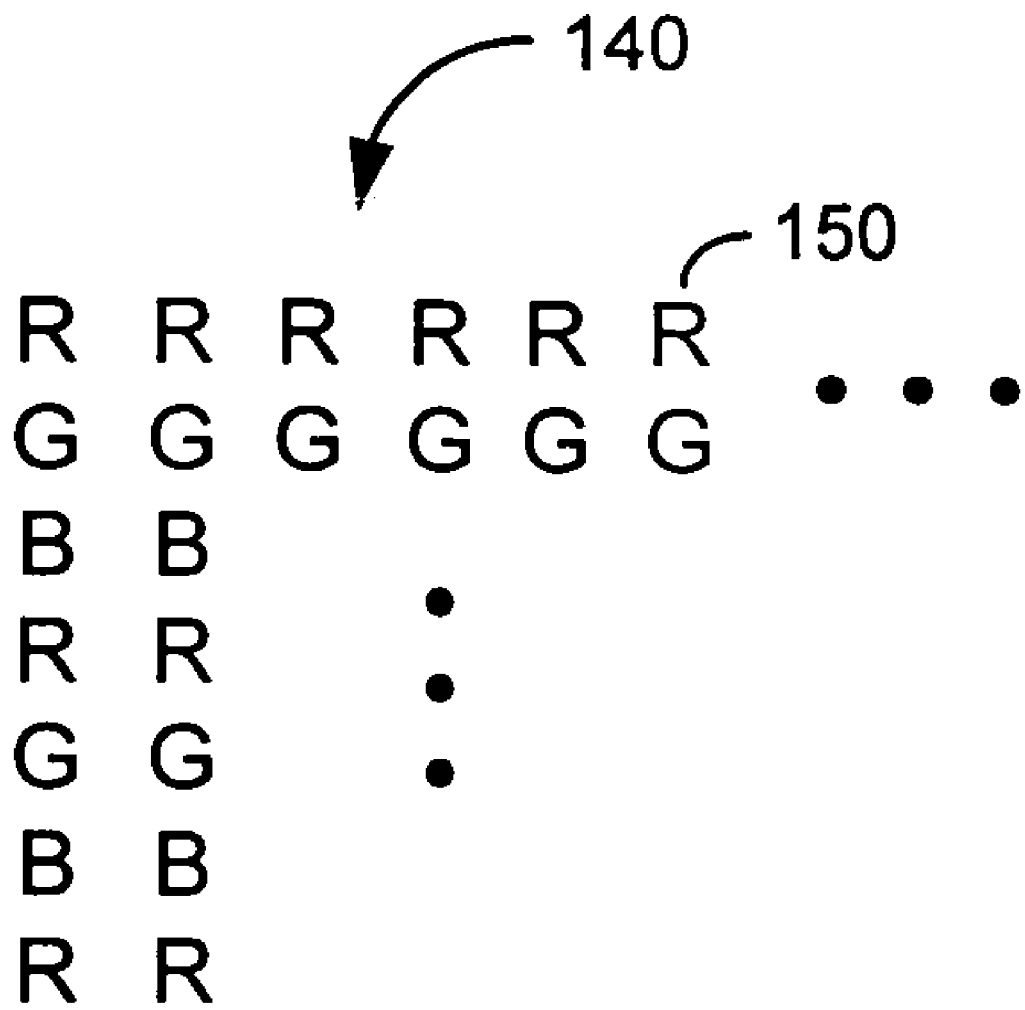
FIG. 4B is an illustration of a color filter array of an area-array imaging sensor in accordance with another illustrative embodiment of the invention.

The need for non-destructive readout of sensor 140 may be avoided if the color filter array is configured such that each row of sensor 140 contains pixels 150 of only one color component, as shown in FIG. 4B. In such an arrangement, each row of sensor 140 need only be read once after an appropriate delay, relative to reset, equaling the desired exposure time for the color component being read out.

Any form of rolling shutter induces distortion in photographs of moving objects, the amount of distortion depending on the speed of the shutter and of the object. For example, wheels on moving vehicles become slanted ovals. Having independent exposure times for the color components adds color artifacts to these already-present temporal artifacts. Consequently, in some embodiments, exposure computation logic 190 may intentionally compensate for color imbalance in the pre-exposure frame only partially. In such an embodiment, additional color-balance adjustment may be performed as a post-processing step after the digital image has been captured.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for controlling color balance in a digital image captured by a digital imaging device, comprising:
   acquiring a pre-exposure frame;
   analyzing the pre-exposure frame to determine a respective exposure time for each of a set of color components, the respective exposure time of each color component being inversely related to its strength relative to the other color components;
   resetting a row-addressable area-array sensor to initiate the exposure times, the row-addressable area-array sensor being arranged in rows and having a set of pixels for each color component; and
   reading out the pixels of each color component sequentially after the corresponding exposure time has elapsed;
   wherein the reading out of the pixels comprises, for each of multiple of the rows of the row-addressable area-array sensor,
      for each of the color components contained in the row, non-destructively reading the pixels of the color component in the row at a respective time after the row was last reset corresponding to the respective exposure time of the color component.

2. A digital imaging device, comprising:
   a row-addressable area-array sensor, the row-addressable area-array sensor being arranged in rows and having a set of pixels for each of a set of color components;
   exposure computation logic configured to analyze a pre-exposure frame to determine a respective exposure time for each color component, the respective exposure time of each color component being inversely related to its strength relative to the other color components; and
   exposure control logic configured to reset the row-addressable area-array sensor to initiate the exposure times and to concurrently read out the pixels of each color component after the corresponding exposure time has elapsed;
   wherein in reading out the pixels the exposure control logic is configured to perform operations comprising, for each of multiple of the rows of the row-addressable area-array sensor,
      for each of the color components contained in the row, non-destructively reading the pixels of the color component in the row at a respective time after the row was last reset corresponding to the respective exposure time of the color component.

3. A digital imaging device, comprising:
   means for converting an optical image to a digital image, the means for converting an optical image to a digital image being arranged in rows and having a set of pixels for each of a set of color components, the means for converting an optical image to a digital image being row-addressable;
   means for analyzing a pre-exposure frame to determine a respective exposure time for each color component, the respective exposure time of each color component being inversely related to its strength relative to the other color components; and
   means for resetting the means for converting an optical image to a digital image to initiate the exposure times and sequentially reading out the pixels of each color component after the corresponding exposure time has elapsed;
   wherein in reading out the pixels the means for resetting and sequentially reading is configured to perform operations comprising, for each of multiple of the rows of the row-addressable area-array sensor,
      for each of the color components contained in the row, non-destructively reading the pixels of the color component in the row at a respective time after the row was last reset corresponding to the respective exposure time of the color component.

4. The method of claim 1, wherein the row-addressable area-array sensor comprises a CMOS sensor.

5. The method of claim 1, wherein a color filter array of the row-addressable area-array sensor is configured such that each row contains pixels of only one color component.

6. The method of claim 1, wherein the exposure times are intentionally chosen to compensate only partially for color imbalance in the pre-exposure frame.

7. The method of claim 1, wherein the color components comprise red, green, and blue and the exposure time is shortest for red, next shortest for green, and longest for blue.

8. The method of claim 1, wherein the color components comprise red, green, and blue and the exposure time is shortest for blue, next shortest for green, and longest for red.

9. The digital imaging device of claim 2, wherein the row-addressable area-array sensor comprises a CMOS sensor.

10. The digital imaging device of claim 2, wherein a color filter array of the row-addressable area-array sensor is configured such that each row contains pixels of only one color component.

11. The digital imaging device of claim 2, wherein the exposure computation logic is configured to determine exposure times that compensate only partially for color imbalance in the pre-exposure frame.

12. The digital imaging device of claim 2, wherein the color components comprise red, green, and blue and the exposure computation logic determines a shortest exposure time for red, a next-shortest exposure time for green, and a longest exposure time for blue.

13. The digital imaging device of claim 2, wherein the color components comprise red, green, and blue and the exposure computation logic determines a shortest exposure time for blue, a next-shortest exposure time for green, and a longest exposure time for red.

14. The digital imaging device of claim 2, wherein the digital imaging device comprises one of a digital camera and a digital camcorder.

15. The digital imaging device of claim 3, wherein the means for converting an optical image to a digital image comprises a CMOS sensor.

16. The digital imaging device of claim 3, wherein the digital imaging device comprises one of a digital camera and a digital camcorder.

17. The method of claim 1, wherein the resetting comprises resetting the rows of the row-addressable sensor row-by-row.

* * * * *

UNITED STATES PATENT AND TRADEMARK OFFICE
CERTIFICATE OF CORRECTION

| | |
|---|---|
| PATENT NO. | : 7,978,245 B2 |
| APPLICATION NO. | : 10/877087 |
| DATED | : July 12, 2011 |
| INVENTOR(S) | : Donald J. Stavely |

It is certified that error appears in the above-identified patent and that said Letters Patent is hereby corrected as shown below:

In column 6, line 31, in Claim 2, delete "sensor." and insert -- sensor, --, therefor.

Signed and Sealed this
Third Day of April, 2012

David J. Kappos
*Director of the United States Patent and Trademark Office*